United States Patent [19]

Kulig

[11] Patent Number: 4,813,994
[45] Date of Patent: * Mar. 21, 1989

[54] STRAIGHT LINE GLASS GOB SHEAR

[75] Inventor: Constantine W. Kulig, Windsor, Conn.

[73] Assignee: Emhart Industries, Inc., Farmington, Conn.

[*] Notice: The portion of the term of this patent subsequent to Oct. 13, 2004 has been disclaimed.

[21] Appl. No.: 33,553

[22] Filed: Apr. 2, 1987

Related U.S. Application Data

[63] Continuation of Ser. No. 731,300, May 7, 1985, Pat. No. 4,699,643.

[51] Int. Cl.$^4$ .............................................. G03B 7/12
[52] U.S. Cl. ........................................ 65/334; 65/163; 65/167; 83/623; 83/694
[58] Field of Search ............... 65/163, 167, 300, 334, 65/303; 83/623, 694

[56] References Cited

U.S. PATENT DOCUMENTS

| | | | |
|---|---|---|---|
| 1,642,966 | 9/1927 | Miller | 65/334 |
| 4,215,611 | 8/1980 | Dahms | 83/623 |
| 4,388,100 | 6/1983 | Marroquin | 65/334 |
| 4,699,643 | 10/1987 | Kulig | 65/334 |
| 4,728,354 | 3/1988 | Vick et al. | 65/334 |

Primary Examiner—Arthur Kellogg
Attorney, Agent, or Firm—Spencer T. Smith

[57] ABSTRACT

This relates to improvements in drives for shears, particularly shears for severing gobs from a glass runner. All of the drives incorporate a drive pinion for reciprocating racks which are secured to slides of the shear. The pinion is rotated first in one direction and then in the opposite direction to cause the blades of the shear to first move together and shear a gob, and then move back to the original position. Suitable reversing motors may be utilized, including an electrical servomotor or suitable hydraulic motor. On the other hand, the drive motor may be of the unidirectional type and an oscillating drive member may be incorporated in the drive system for converting the one-directional drive of the motor to an oscillating or reversing output. In addition, the drive of the pinion may be supplemented by a double-acting air motor which is connected to one of the racks. The air motor or cylinder will provide the primary motor power for the shear, but the velocity thereof will be controlled by the servomotor or like motor which is connected to the pinions through a nonreversing drive.

3 Claims, 3 Drawing Sheets

FIG. 1
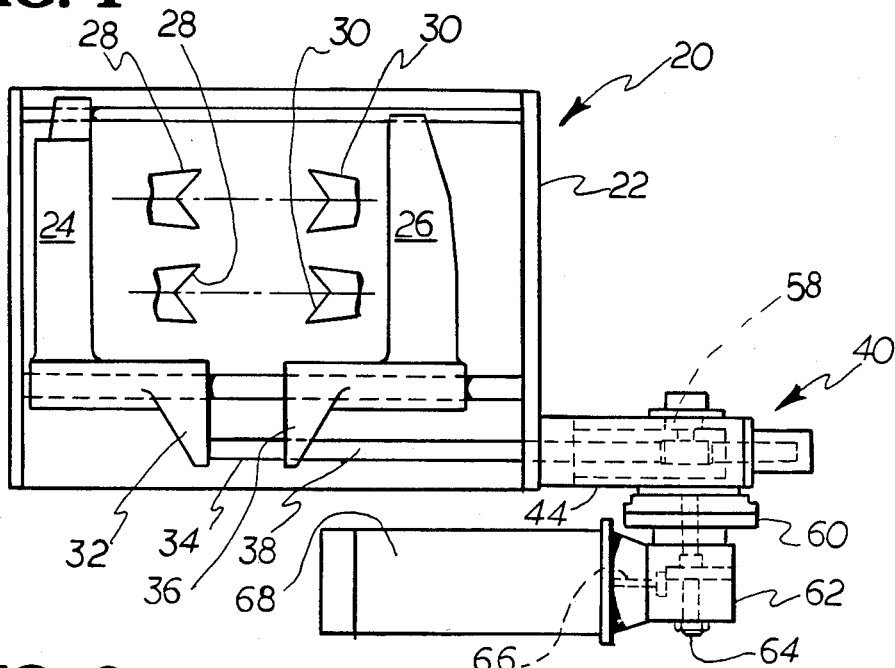
FIG. 2
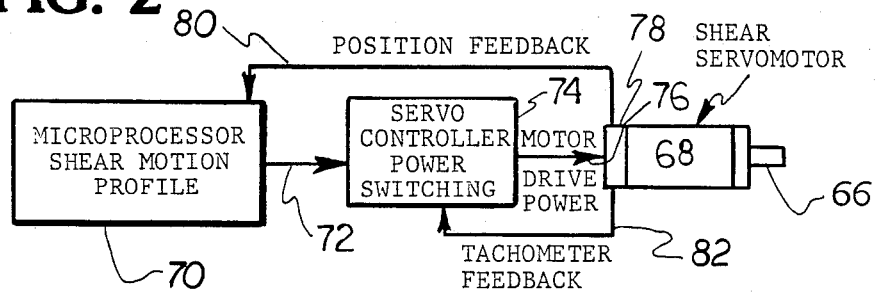
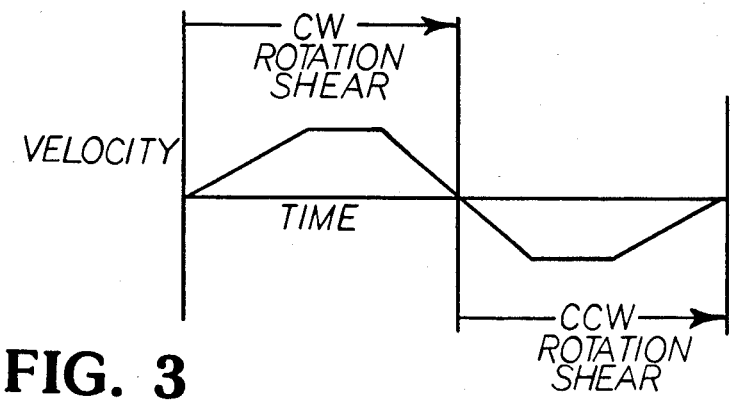
FIG. 3

VELOCITY PROFILE

U.S. Patent  Mar. 21, 1989  Sheet 3 of 3  4,813,994
FIG. 7
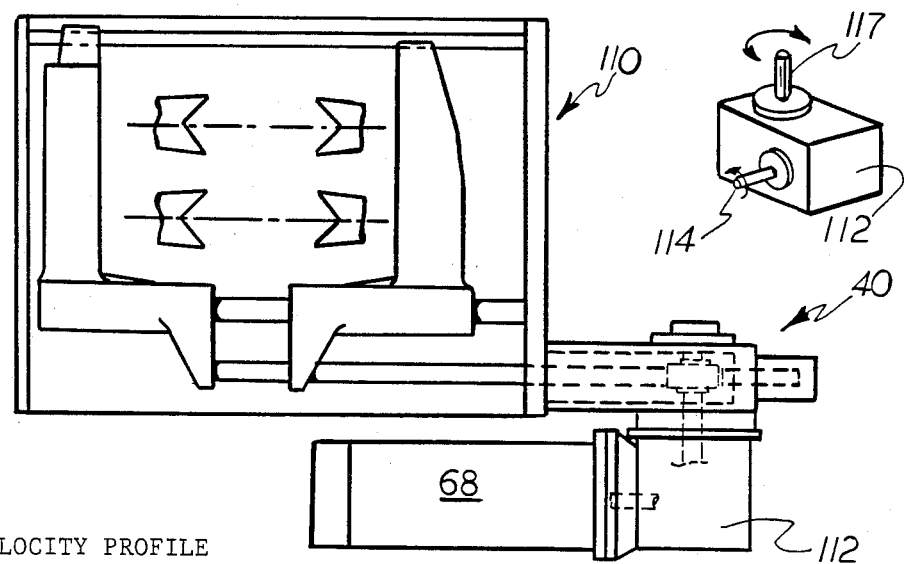
FIG. 8
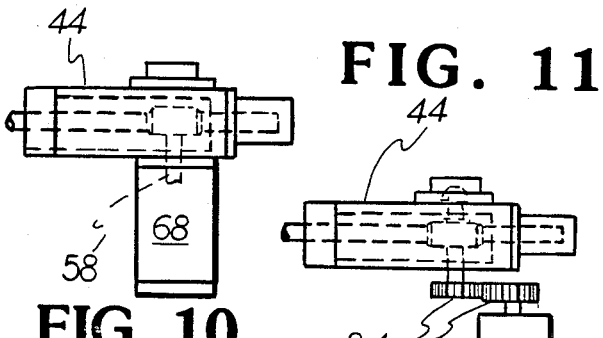
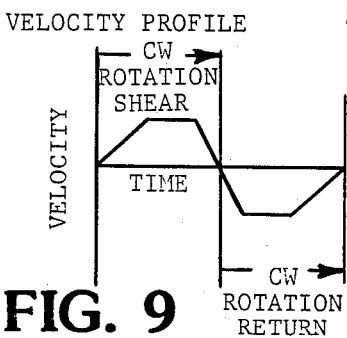
FIG. 9
FIG. 10
FIG. 11
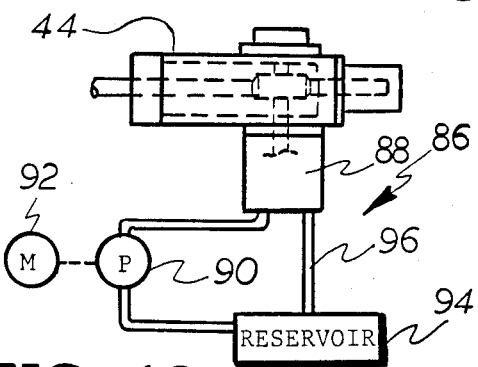
FIG. 12
FIG. 13
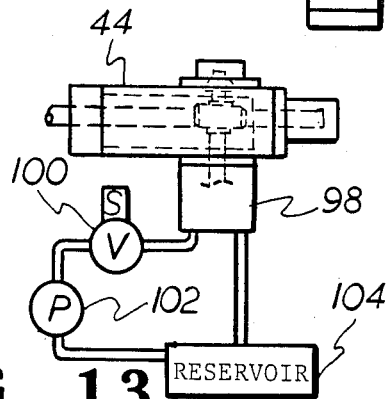

4,813,994

STRAIGHT LINE GLASS GOB SHEAR

BACKGROUND OF THE INVENTION

This is a continuation of co-pending application Ser. No. 731,300 filed on May 7, 1985 now U.S. Pat. No. 4,699,643.

This invention relates in general to new and useful improvements in straight line shears for cutting glass runners into individual gobs, and more particularly to improved rotary drives for such shears.

This invention, in particular, constitutes a modification on the shear drive disclosed in U.S. Pat. No. 4,215,611 to Francis A. Dahms, granted Aug. 5, 1980, assigned to the assignee of the present invention. The disclosure of the aforesaid patent is incorporated herein by reference.

It is known to provide a straight line shear wherein there are two slides mounted for guided movement towards and away from one another, and arranged in opposed relation. The slides carry cooperating blades. The slides are driven by racks which are interconnected by a pinion. The drive unit is in the form of a double-acting air cylinder or linear air motor which is coupled to one of the racks between that rack and an associated one of the slides.

BRIEF SUMMARY OF THE INVENTION

In accordance with this invention, there is provided a rotary drive which is coupled to a pinion to effect rotation of the pinion which, in turn, will reciprocate both racks in the required opposite direction. On the one hand such a rotary drive unit may be in the form of an electrical servomotor. Such an electrical servomotor will be controlled by a microprocessor together with a servo controller power switching device. On the other hand, the rotary drive unit may be in the form of electric-hydraulic stepping motor or a hydraulic rotary motor with an electric hydraulic control valve.

The rotary drive unit may be directly coupled to the pinion or may be coupled thereto by way of spur gears or beveled gears. When beveled gears are utilized, the rotary drive unit may be disposed parallel to the drive mechanism.

In accordance with the present invention, the double-acting air cylinder normally would be discarded. On the other hand, it is feasible to utilize in conjunction with the double-acting air cylinder a rotary drive unit which would provide the required supplemental torque during the shearing operation.

It is also feasible to provide a unidirectional drive unit which would be coupled to a converter having a one direction input and a reversing output.

In the drawing, wherein throughout like numerals refer to like parts,

FIG. 1 is a schematic plan view showing one embodiment of straight line shear utilizing an electro servomotor coupled to the drive pinion by a beveled gear;

FIG. 2 is a wiring schematic for the servomotor;

FIG. 3 is a velocity profile for the shear;

FIG. 7 is another schematic plan view of a modified form of shear drive incorporating a one-direction rotation rotary drive unit utilizing a direction converter;

FIG. 8 is a schematic perspective view of the motion converter;

FIG. 9 is a graph showing the velocity profile of the shear shown in the embodiment of FIG. 7;

FIG. 10 is a fragmentary view showing the rotary drive unit of FIG. 1 directly coupled to the pinion of the drive assembly;

FIG. 11 is a fragmentary view similar to FIG. 10 and shows the rotary drive unit connected to the pinion utilizing spur gears;

FIG. 12 is a fragmentary schematic view showing the rotary drive unit as an electric-hydraulic stepping motor; and FIG. 13 is another fragmentary schematic view showing the rotary drive unit as a rotary hydraulic motor with an electric-hydraulic control valve.

DETAILED DESCRIPTION OF THE PREFERRED EMBODIMENTS OF THE INVENTION

Figure 4:
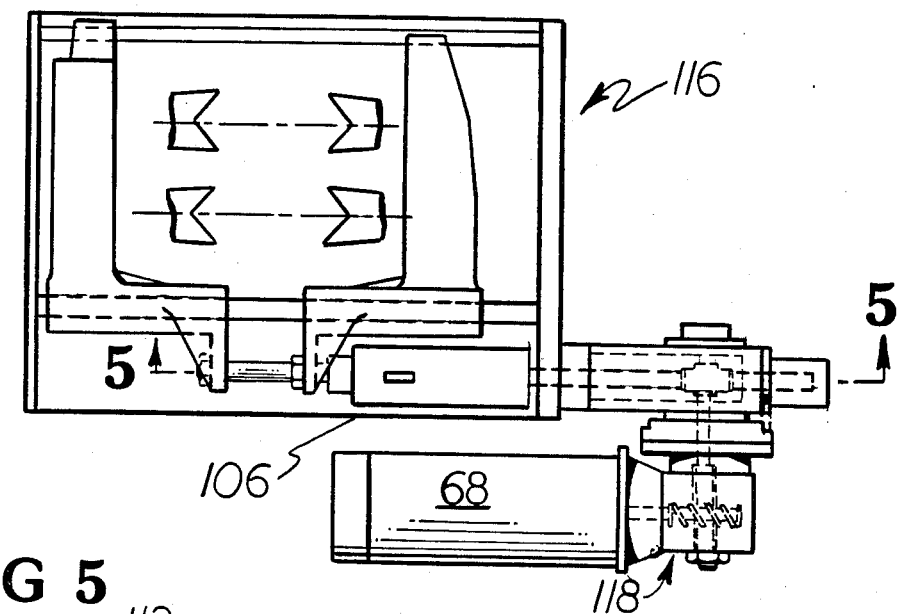
FIG. 4 is a schematic plan view similar to FIG. 1 but of an embodiment wherein the rotary drive unit provides a supplemental torque to a double-acting air cylinder.

Referring now to the drawing in detail, reference is first made to FIG. 1 wherein there is illustrated a straight line shear generally identified by the numeral 20. This shear, in simple terms, includes a support or frame 22 which has suitable guides for a pair of opposed slides 24, 26 which are mounted within the support 22 for simultaneous reciprocation towards and away from one another. The slides 24, 26 carry blades 28, 30 which cooperate with one another for the purpose of shearing a glass runner to form gobs. Although two sets of blades 28, 30 have been illustrated, it is to be understood that the shear may incorporate but a single set or may include as many as three sets or more.

Figure 5:
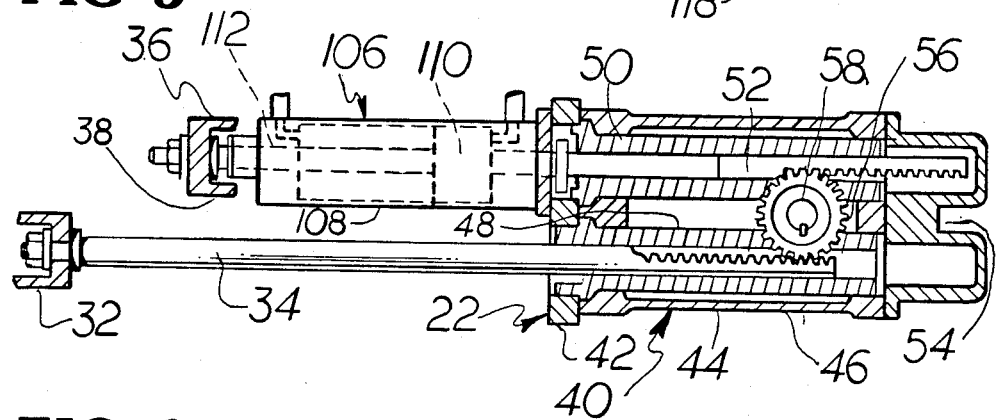
FIG. 5 is an enlarged fragmentary vertical sectional view taken generally along the line 5—5 of FIG. 4 and shows the specifics of the rack and pinion type drive.

The slide 24 has a bracket 32 to which there is connected an actuating rod 34. The slide 26 has a similar bracket 36 to which there is coupled an actuating rod 38. The actuating rods 34, 38 are reciprocated by a drive assembly generally identified by the numeral 40. Reference is now made to FIG. 5 wherein there is illustrated a typical drive, such as the drive 40. It will be seen that the support 22 includes a mounting plate 42 which carries a housing 44. The housing 44 has mounted therein a guide tube 46 in which there is guidingly mounted one end of the rod 34. The terminal portion of the rod 34 includes a rack 48.

The housing 44 carries a second guide tube 50 in which there is guided for reciprocation an end portion 52 of the rod 38. The end portion 52 is also provided with a rack 54 which opposes a rack 48. A pinion 56 is positioned between the racks 48, 54 and is meshed therewith. The pinion 56 is keyed to a drive shaft 58 which is suitably rotatably journaled within the housing 44.

In accordance with the embodiment of the invention illustrated in FIG. 1, the housing 44 is provided on one side thereof with an adaptor plate 60 to which there is secured a right angle drive 62 which includes a shaft 64 which may be a continuation of the shaft 58 or directly coupled thereto. The right angle drive 62 has cooperating mitre or beveled gears which are driven through a drive shaft 66 of an electrical servomotor 68. It is to be understood that the servomotor 68, when actuated, would rotate first in one direction and then reverse its direction of rotation so that the blades 28, 30 will be first advanced together to effect the shearing operation, and then separated to their original positions.

Referring now to FIG. 2, it will be seen that there is illustrated a schematic of the drive for the electrical servomotor 68. Actuation of the servomotor 68 is primarily by means of a microprocessor which provides the shear motion profile, the microprocessor being identified by the numeral 70. The microprocessor 70 has an output 72 connected to a servo controller 74 which effects power switching. The servo controller 74 has an output 76 connected to a control head 78 of the servomotor 68 for controlling actuation of the servomotor 68.

The control system includes a feedback 80 from the control head 78 to the microprocessor 70. There is also a tachometer feedback 82 from the control head 78 to the servo controller.

FIG. 3 is a graph plotting velocity against time showing that the shear equipped with the servomotor 68 as illustrated in FIG. 1 will have a rapid acceleration to a maximum speed, then a constant speed followed by a rapid deceleration. After the cut or shear occurs, the acceleration and deceleration are reversed.

Although the servomotor 68 has been illustrated in FIG. 1 as being connected to the shaft 58 through a right angle drive, it is to be understood that the servomotor 68 may be at right angles to the position of FIG. 1, as is shown in FIG. 10, and directly coupled to the pinion shaft 58.

On the other hand, the servomotor 68 may be coupled to the pinion shaft 58 by spur gears 84 as is shown in FIG. 11.

Further, it is to be understood that the servomotor 68 may be replaced by an electro-hydraulic stepping motor system 86, as shown in FIG. 12, which includes a rotary hydraulic motor 88 supplied with hydraulic fluid by a pump 90 which is driven by a stepping electrical motor 92. The pump 90 is supplied from a reservoir 94 which receives spent hydraulic fluid from the hydraulic motor 88 through a return line 96.

In FIG. 13 there is illustrated another utilization of a hydraulic motor. In this embodiment a rotary hydraulic motor 98 is directly coupled to the pinion shaft and the operation thereof is controlled by an electrical or solenoid control valve 100 which controls flow from a pump 102 of hydraulic fluid under pressure. The pump 102 receives the hydraulic fluid from a reservoir 104 which receives the return from the hydraulic motor 98.

Reference is once again made to FIG. 5 wherein it will be seen that the rod 38 is actually a piston rod of a double-acting linear air motor or cylinder generally identified by the reference numeral 106. The air motor 106 includes a cylinder 108 in which a piston 110 is mounted, and which piston 110 has a piston rod 112 which is coupled to or may form the rod 38.

The piston rod 112 also extends out through the opposite end of the cylinder and is connected to the rod portion 52.

From the description of FIG. 5, it will be seen that the shear may be actuated utilizing the double-acting air motor 106. However, it has been found that beneficial results may be obtained with the shear arrangement shown in FIG. 4 and generally identified by the numeral 116. The shear 116 is identical to the shear 20 with the exception of the incorporation of the double-acting air cylinder 106. In this embodiment of the shears, the servomotor 68, or similar motor, may be utilized to supplement the drive provided by the air cylinder 106.

It is to be understood that the servomotor 68 will be driven in the manner described with respect to the shear 20. In this embodiment of the invention, sufficient air pressure is supplied to the air cylinder 106 to move the shear in excess of the desired cutting velocity. The microprocessor 70 provides a signal to the electric air control valve to apply air to the cylinder to move the shear for the cutting of a gob. However, if the right angle drive is a locking worm and wheel gear reducer 118, the air motor cannot actuate the shear until the servomotor 68 permits such movement. Thus, the servomotor 68 controls the motion of the cutting stroke and the air motor provides the power.

Further, and most particularly, the torque applied to the pinion by the servomotor supplements the force applied to the shear by the air cylinder.

It is to be understood that both the air to the air cylinder and the direction of rotation of the servomotor is reversed for the return stroke of the shear.

Figure 6:
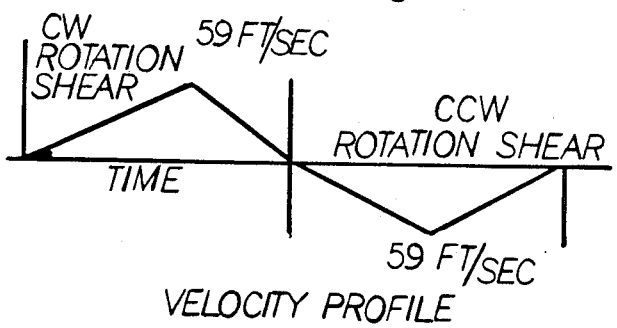
FIG. 6 is a graph showing the velocity profile of the shear shown in the embodiment of FIG. 4.

A typical velocity profile for the shear arrangement of FIG. 4 is shown in the graph of FIG. 6.

Reference now is made to the embodiment of FIG. 7 wherein there is illustrated a shear generally identified by the numeral 110. The shear 110 will be identical to the shear 20 with the exception of the rotary drive unit. In lieu of the servomotor 68 being coupled to the pinion shaft 58 by way of a conventional right angle drive, there is an oscillating drive 112 between the servomotor 68 and the drive unit 40. The drive 112 may be a purchased item and is best illustrated in FIG. 8. The illustrated drive unit 112 may be what is conventionally known as a Ferguson drive, or the equal. The drive 112 will be provided with a one-direction rotational input shaft 114 and an oscillating or reversing rotation output shaft 117. Thus, the servomotor 68 or other type of drive motor need not be of the reversing type.

FIG. 9 is a graph showing the plotting of velocity against time for the shear 110 illustrated in FIG. 7.

It is to be understood that the electric servomotor 68 may be replaced with other types of drive motors as previously discussed.

It is also to be understood that the specific drives for the various shear arrangements discussed hereinabove provides for high-speed operation with maximum control so that the shearing of gobs may be increased while at the same time the resistance to the movement of the glass runner by the blades of the shear may be decreased.

Although only several preferred embodiments of drives for a straight line shear have been illustrated and described herein, it is to be understood that minor variations may be made therein without departing from the spirit and scope of the invention as defined by the appended claims.

It is claimed:

1. A straight line shear for forming glass gobs comprising:
   a pair of opposed slides carrying opposed shear blades,
   guide means for guiding the slides for displacement along a predetermined path,
   a pair of spaced apart toothed racks coupled to said slides,
   pinion drive means for conjointly, equally displacing said racks in opposite directions including pinion means, and
   motor means coupled to said pinion means.

2. A straight line shear according to claim 1 wherein said motor means is a servo-motor.

3. A straight shear according to claim 2 wherein said motor means further comprises right angle drive means for interconnecting with said pinion means.

* * * * *